3,087,792
RARE-EARTH ARSENIDES

Lothar H. Brixner, West Chester, Pa., assignor to E. I. du Pont de Nemours and Company, Wilmington, Del., a corporation of Delaware
No Drawing. Filed Mar. 23, 1960, Ser. No. 16,933
9 Claims. (Cl. 23—204)

This invention relates to new compositions of matter, and more particularly to certain rare-earth arsenides. These arsenides are semiconducting materials which can be employed in thermoelectric applications at elevated temperatures.

The arsenides of this invention are rare-earth arsenides of the formula AB where B is arsenic and A is a rare-earth metal selected from the group consisting of europium, gadolinium, terbium, dysprosium, holmium, erbium, thulium, and ytterbium. Specific arsenides having the aforementioned formula are europium arsenide (EuAs), gadolinium arsenide (GdAs), terbium arsenide (TbAs), dysprosium arsenide (DyAs), holmium arsenide (HoAs), erbium arsenide (ErAs), thulium arsenide (TmAs), and ytterbium arsenide (YbAs).

The arsenides of this invention can be prepared by heating a powdered mixture of arsenic and the rare-earth metal in equimolar proportions. When reaction temperature is reached (about 350° C.), a violent exothermic reaction is initiated which produces the desired end product. This product can then be compacted into a desired shape.

In a preferred method of preparation, the arsenides of this invention are produced by intimately mixing portions of the rare earth element, finely divided, with an equimolar quantity of arsenic, also in a finely divided state. The mixture is then compacted into a unitary mass and heated under an inert atmosphere to a temperature at which an exothermic reaction is initiated, about 350° C. The heating is maintained, usually for a period of about 2–4 hours, and the fired product thus obtained is then cooled to room temperature while still under an inert atmosphere. The cooled product is then reground and again compacted into a unitary mass of a desired shape. However, prior to compaction, the weight of the product is checked to determine whether any of the arsenic had volatilized during reaction. As previously mentioned, the reaction is violent, and a small portion of the arsenic will often volatilize, leaving some unreacted rare-earth metal with the end product. In instances where arsenic is volatilized, an additional quantity of this element is added to provide equimolar quantities in the compacted product. This product is then fired at temperatures ranging from about 800° C.–1200° C. for about 4–8 hours, and preferably at about 1000° C. for about 6 hours, to produce a strong, dense semiconducting material possessing thermoelectric properties and having high thermal stability and a negative temperature coefficient of resistivity.

A preferred method of preparing the rare-earth arsenides of this invention is to heat the stoichiometric quantities of the reactants in evacuated sealed quartz ampoules. When this method of procedure is used, no arsenic can be lost through volatilization during the heating, or due to the heat of the reaction. It is then unnecessary to check the weight of the product after the first firing as is described above.

For a clearer understanding of the invention, the following specific examples are given. These examples are intended to be merely illustrative of the invention and not in limitation thereof. Unless otherwise specified, all parts are by weight.

EXAMPLE I

Europium arsenide was prepared in the following manner:

3.01 parts of europium power (−100 mesh) and 1.4833 parts of arsenic (−200 mesh) were intimately mixed by grinding them together in a mechanical agate ball mill. The mixture was pressed into a pellet under a pressure of 20 t.s.i. This pellet was then sealed in an evacuated quartz ampoule 7" in length and 5/8" in diameter and heated to a temperature of about 350° C., at which temperature a strongly exothermic reaction was initiated. The pellet enclosed in the ampoule was held at a temperature of about 800° C. for about two hours, and the furnace was cooled to room temperature. The fired pellet was removed from the ampoule, was reground, repressed, and reheated to 1000° C. under gettered argon. The pellet was held at about 1000° C. for 6 hours and furnace cooled. The product was a shiny, gray, dense pellet. X-ray analysis indicated that neither of the original components was present in the elemental state in the product. This product could not, however, be classified in the B-1 type structure (according to the Schoenfliess nomenclature) as could each of the other rare-earth arsenides of this invention. The resistivity of the product as reported in Table I was measured by the four-point method. Electrical energy was developed by butting the product between two copper blocks (machined from the same piece of stock) maintained at different temperatures. Temperatures were measured at approximately the cross-sectional center of the bar immediately behind the contact faces. With a temperature differential ($\Delta T$) of 105° C. ($T_1$, 64° C., $T_2$, 169° C.), an E.M.F. of 4.22 millivolts was obtained. The Seebeck coefficient $$\left(\frac{E.M.F.}{\Delta T} \times 1000\right)$$

was calculated from this data; this value and other electrical properties are given in Table I.

EXAMPLE II

This example describes the preparation of GdAs. 3.637 parts of gadolinium and 1.737 parts of arsenic (Gd:As molar ratio 1:1) were prepared in sealed quartz ampoules according to the procedure described in Example I. Tests on the material were made in the manner described in Example I. An E.M.F. of 1.68 millivolts was obtained with a temperature differential of 185° C. ($T_1$, 42° C.; $T_2$, 227° C.). The Seebeck coefficient was calculated from this data; this value and other electrical properties are given in Table I.

EXAMPLE III

This example describes the preparation of TbAs. 3.030 parts of terbium and 1.4203 parts of arsenic (Tb:As molar ratio 1:1) were prepared in sealed quartz ampoules according to the procedure described in Example I. Tests on the material were made in the manner described in Example I. An E.M.F. of 1.96 millivolts was obtained with a temperature differential of 105° C. ($T_1$, 59° C.; $T_2$, 164° C.). The Seebeck coefficient was calculated from this data; this value and other electrical properties are given in Table I.

EXAMPLE IV

This example describes the preparation of DyAs. 3.01 parts of dysprosium and 1.388 parts of arsenic (Dy:As molar ratio 1:1) were prepared in sealed quartz ampoules according to the procedure described in Example I. Tests on the material were made in the manner described in Example I. An E.M.F. of 1.75 millivolts was obtained with a temperature differential of 154° C. ($T_1$, 56° C.;

$T_2$, 210° C.). The Seebeck coefficient was calculated from this data; this value and other electrical properties are given in Table I.

EXAMPLE V

This example describes the preparation of HoAs. 3.20 parts of holminum and 1.466 parts of arsenic (Ho:As molar ratio 1:1) were prepared in sealed quartz ampoules according to the procedure described in Example I. Tests on the material were made in the manner described in Example I. An E.M.F. of 0.97 millivolt was obtained with a temperature differential of 120° C. ($T_1$, 56° C.; $T_2$, 176° C.). The Seebeck coefficient was calculated from this data; this value and other electrical properties are given in Table I.

EXAMPLE VI

This example describes the preparation of ErAs. 3.04 parts of erbium and 1.362 parts of arsenic (Er:As molar ratio 1:1) were prepared in sealed quartz ampoules according to the procedure described in Example I. Tests on the material were made in the manner described in Example I. An E.M.F. of 1.83 millivolts was obtained with a temperature differential of 114° C. ($T_1$, 54° C.; $T_2$, 168° C.). The Seebeck coefficient was calculated from this data; this value and other electrical properties are given in Table I.

EXAMPLE VII

This example describes the preparation of TmAs. 3.30 parts of thulium and 1.459 parts of arsenic (Tm:As molar ratio 1:1) were prepared in sealed quartz ampoules according to the procedure described in Example I. Tests on the material were made in the manner described in Example I. An E.M.F. of 0.35 millivolt was obtained with a temperature differential of 50° C. ($T_1$, 17° C.; $T_2$, 67° C.). The Seebeck coefficient was calculated from this data; this value and other electrical properties are given in Table I.

EXAMPLE VIII

This example describes the preparation of YbAs. 3.00 parts of ytterbium and 1.299 parts of arsenic (Yb:As molar ratio 1:1) were prepared in sealed quartz ampoules according to the procedure described in Example I. Tests on the material were made in the manner described in Example I. An E.M.F. of 1.04 millivolts was obtained with a temperature differential of 65° C. ($T_1$, 22° C.; $T_2$, 87° C.). The Seebeck coefficient was calculated from this data; this value and other electrical properties are given in Table I.

The following properties were obtained for the products of the above examples:

*Table I*

STRUCTURAL AND ELECTRICAL DATA RARE-EARTH ARSENIDES

| Product of Example— | Composition | Space Group (Schoenfliess nomenclature) and Lattice Parameter in— | | 298° K. Electrical Resistivity, mΩ. cm. | Seebeck Coefficient in microvolts per ° C. | At Mean T, ° C. |
|---|---|---|---|---|---|---|
| | | A. | Units | | | |
| I | EuAs | | | 1.87 | 25 | 115 |
| II | GdAs | $O_h^5$ | 5.854 | 3.95 | 9 | 108 |
| III | TbAs | $O_h^5$ | 5.813 | 1.80 | 18 | 121 |
| IV | DyAs | $O_h^5$ | 5.780 | 13.80 | 12 | 105 |
| V | HoAs | $O_h^5$ | 5.759 | 4.00 | 9 | 111 |
| VI | ErAs | $O_h^5$ | 5.732 | 7.20 | 16 | 117 |
| VII | TmAs | $O_h^5$ | 5.711 | 14.7 | 7 | 120 |
| VIII | YbAs | $O_h^5$ | 5.698 | 128 | 16 | 109 |

The products of the strongly exothermic reactions described in the above examples are gray crystalline materials having melting points in excess of 1000° C. No rare-earth metal or arsenic lines were found present in any of the Debye-Scherrer X-ray powder patterns.

The rare-earth metals and the arsenic used in the above examples were purchased materials of 99+% purity. It is, of course, realized that the Seebeck coefficient of a particular compound under any given set of conditions will vary depending upon such factors as the purity of the starting materials used to produce the arsenides; the conditions under which such arsenide is produced; and the possibility of having an unreacted component in the end product due either to the volatilization of arsenic or the use of a slight excess of one of the reactants. For example, the Seebeck coefficient for europium arsenide, when tested according to the method described in the examples, will range from 15–40 microvolts per ° C. It will also be found that the Seebeck voltage for other compounds included in this invention, when tested under the conditions set forth in the examples, will be:

| | Seebeck coefficient, microvolts per ° C. |
|---|---|
| GdAs | 5–25 |
| TbAs | 10–30 |
| DyAs | 8–24 |
| HoAs | 5–15 |
| ErAs | 10–25 |
| TmAs | 5–15 |
| YbAs | 10–30 |

Because of their high thermal stability, the new compositions of matter herein disclosed will be found particularly useful in thermoelectric power generation devices for use at elevated temperatures. They will also be found useful in thermoelectric cooling devices. The information concerning the construction of such thermoelectric devices can be found in "Semiconductor Thermoelements and Thermoelectric Cooling," by A. F. Ioffe, London, 1957.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the production of thermoelectric compounds of the formula AB where B is arsenic and A is a rare-earth metal selected from the group consisting of europium, gadolinium, terbium, dysprosium, holmium, erbium, thulium, and ytterbium, said process comprising heating to about 350° C., to initiate an exothermic reaction, a compacted, powdered mixture containing equimolar proportions of arsenic and rare-earth metal, and after cooling, recompacting and firing under an inert atmosphere the end product of the first heating.

2. The process of claim 1 in which the rare earth metal is europium.

3. The process of claim 1 in which the rare earth metal is gadolinium.

4. The process of claim 1 in which the rare earth metal is terbium.

5. The process of claim 1 in which the rare earth metal is dysprosium.

6. The process of claim 1 in which the rare earth metal is holmium.

7. The process of claim 1 in which the rare earth metal is erbium.

8. The process of claim 1 in which the rare earth metal is thulium.

9. The process of claim 1 in which the rare earth metal is ytterbium.

References Cited in the file of this patent

Translation of excerpt from "Gazetta Chimica Italiana," vol. 71, No. 1, 1941, pages 58–62.

"Rare Metals Handbook," by C. A. Hampel, 1954 edition, pages 340–341, Reinhold Publ. Corp., New York.